United States Patent [19]

Honjo et al.

[11] Patent Number: 4,927,443
[45] Date of Patent: May 22, 1990

[54] APPARATUS FOR MANUFACTURING CURVED GLASS SHEETS

[75] Inventors: Seiichiro Honjo; Kazuo Yamada; Yasuhiro Fuchigami; Tetsuya Mizusugi, all of Osaka, Japan

[73] Assignee: Nippon Sheet Glass Company, Ltd., Osaka, Japan

[21] Appl. No.: 179,569

[22] Filed: Apr. 8, 1988

[30] Foreign Application Priority Data

Apr. 8, 1987 [JP] Japan ................................. 62-86573

[51] Int. Cl.⁵ ..................... C03B 23/023; C03B 35/20
[52] U.S. Cl. ......................................... 65/273; 65/289
[58] Field of Search ........................... 65/106, 273, 289

[56] References Cited

U.S. PATENT DOCUMENTS

| | | | |
|---|---|---|---|
| 2,223,124 | 11/1940 | Owen | 65/35 |
| 3,454,389 | 7/1969 | O'Connell et al. | 65/351 |
| 3,455,672 | 7/1969 | Dompkowski | 65/273 |
| 3,476,540 | 11/1969 | Ritter, Jr. et al. | 65/107 |
| 3,507,639 | 4/1970 | Seymour | 65/104 |
| 3,573,022 | 3/1971 | Frank | 65/104 |
| 3,574,588 | 4/1971 | Nitschke | 65/289 |
| 3,600,150 | 8/1971 | Rougeux | 65/289 |
| 3,734,706 | 5/1973 | Ritter, Jr. | 65/104 |
| 3,782,916 | 1/1974 | Powell et al. | 65/104 |
| 4,197,108 | 4/1980 | Frank et al. | 65/273 |
| 4,252,552 | 2/1981 | Frank | 65/106 |
| 4,260,408 | 4/1981 | Reese et al. | 65/106 |
| 4,265,650 | 5/1981 | Reese et al. | 65/104 |
| 4,272,274 | 6/1981 | Frank et al. | 65/273 |
| 4,285,715 | 8/1981 | Frank | 65/106 |
| 4,430,110 | 2/1984 | Frank et al. | 65/104 |
| 4,589,901 | 5/1986 | Yoshizawa et al. | 65/107 |

FOREIGN PATENT DOCUMENTS

| | | |
|---|---|---|
| 3344083 | 10/1984 | Fed. Rep. of Germany . |
| 2121410 | 8/1972 | France . |
| 47-29166 | 8/1972 | Japan . |
| 61-32264 | 7/1986 | Japan . |

Primary Examiner—Joye L. Woodard
Attorney, Agent, or Firm—Lowe, Price, LeBlanc, Becker & Shur

[57] ABSTRACT

An apparatus for manufacturing a curved glass sheet has a glass sheet conveyor mechanism for conveying a glass sheet heated up to its softening point in a heating furnace, and a mold assembly disposed downstream of the heating station with respect to a direction in which the glass sheet is conveyed by the conveyor mechanism, for curving the glass sheet to prescribed curvature. The glass sheet conveyor mechanism includes a pair of fixed rails extending in the glass sheet conveyance direction, a pair of movable rails disposed outwardly of and extending parallel to the fixed rails, the movable rails being movable transversely of the glass sheet conveyance direction, and traveling assemblies guided by the fixed rails for movement between a "standby position" where the softened glass sheet is received from the heating furnace and a "transfer position" where the glass sheet is transferred into the mold assembly. A plurality of pairs of conveyor plates are supported on the traveling assemblies in engagement with the movable rails. The conveyor plates receive the glass sheet at the "standby position". When the conveyor plates reach the "transfer position", the conveyor plates are moved transversely of the glass sheet conveyance direction to allow the glass sheet to be placed on a mold of the mold mechanism.

5 Claims, 6 Drawing Sheets

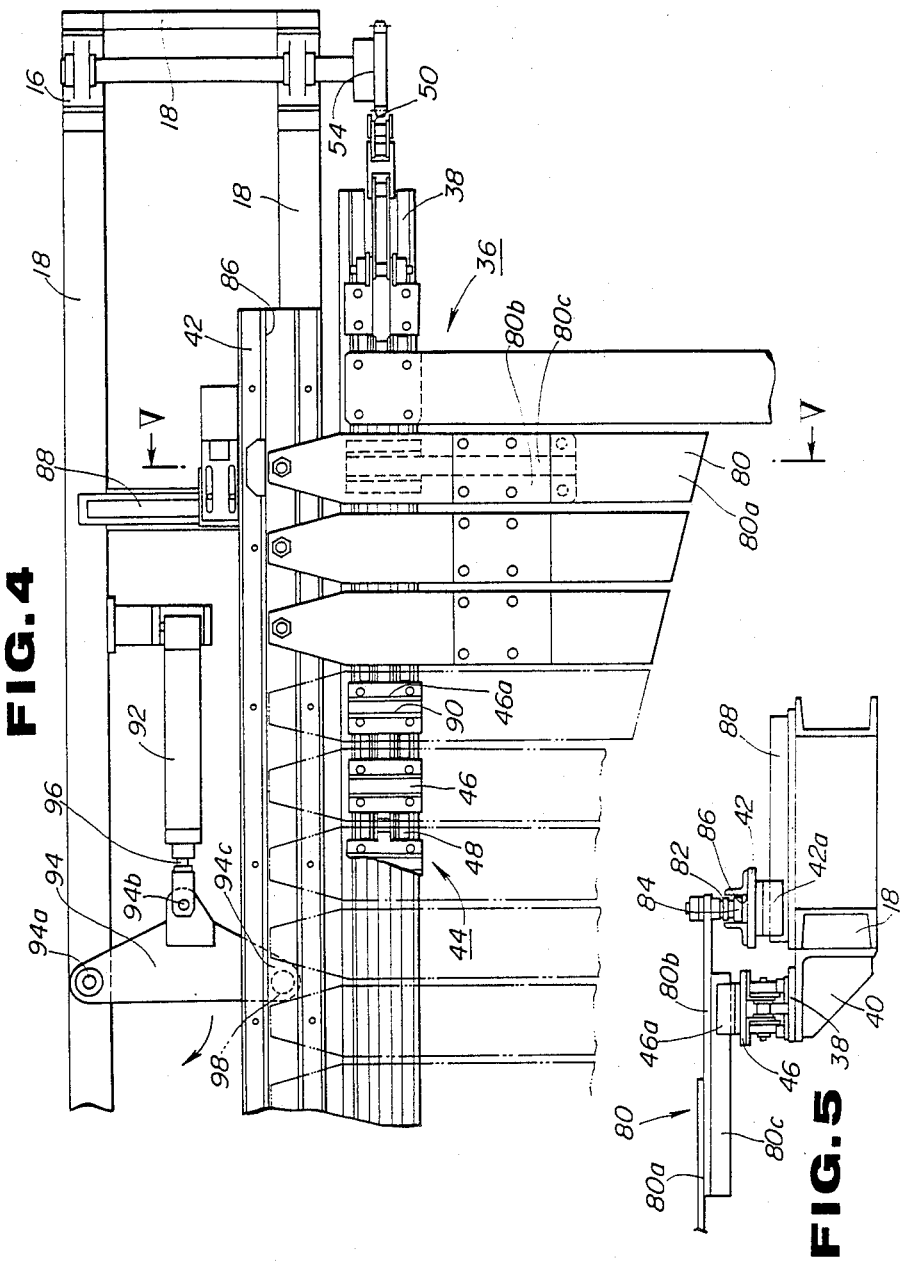

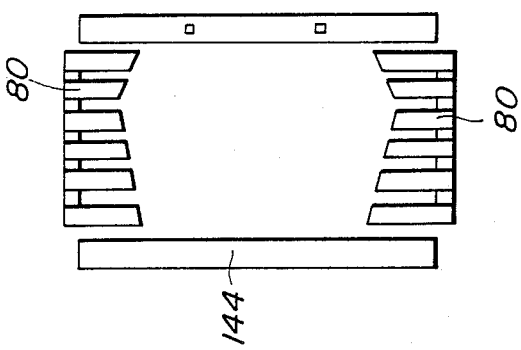
FIG. 8
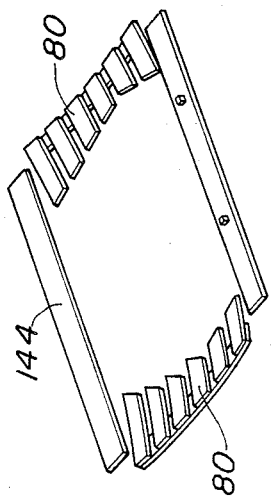
FIG. 9
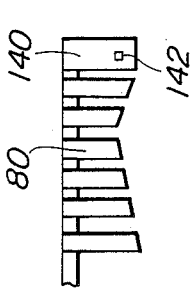
FIG. 7
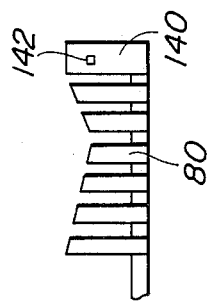

APPARATUS FOR MANUFACTURING CURVED GLASS SHEETS

BACKGROUND OF THE INVENTION

1. Field of the Invention:

The present invention relates to an apparatus for manufacturing curved glass sheets, and more particularly to a glass sheet conveying mechanism in such an apparatus for conveying glass sheets softened by the application of heat from a heating station to a bending station.

2. Description of the Relevant Art:

Toughened shaped or bent glass sheets are widely used as automotive windshields. Such a glass sheet is required to be accurately curved to the shape of an outer profile of an automobile and the shape of a window frame in which the glass sheet is to be mounted. The shaped glass sheet should not contain any optical defects which would otherwise interfere with the clear vision of the automobile driver through the glass sheet.

One of the most commonly practiced processes of manufacturing curved glass sheets starts with the step of heating a flat glass sheet in a heating furnace up to a temperature where glass is deformed, i.e., the softening point of the glass. Then, the heated glass sheet is fed from the heating furnace to a mold assembly by a suitable conveyor means, and then curved to a desired curvature by the mold assembly. After the glass sheet has been bent to shape, it is finally fed to a cooling station by the conveyor means and quenched or annealed by the application of a suitable coolant. The glass sheet is first heated and then quenched for the purpose of making the glass sheet more resistant to breakage, and of causing the glass sheet to fracture into relatively small, relatively smoothly surfaced fragments that are less injurious to passengers than large, jagged fragments.

One typical form of the glass sheet conveyor means as referred to above is disclosed in U.S. Pat. No. 4,252,552 issued to Robert G. Frank on Feb. 24, 1981. The disclosed conveyor means includes a number of conveyor rolls spaced at equal intervals in the direction in which glass sheets are fed along and having axes extending in a direction normal to that direction. A glass sheet conveyed out of a heating furnace by conveyor rolls disposed therein is transferred onto conveyor rolls in a bending station, and then into a mold assembly where the glass sheet is stopped. When the glass sheet is stopped, a lower mold below the conveyor rolls is lifted by a raising and lowering means until the upper surface of the lower mold is held against the lower surface of the glass sheet. The lower mold has a downwardly concave shaping surface with a plurality of grooves extending transversely across the direction in which the glass sheet is conveyed, the grooves being spaced at the same intervals as those of the conveyor rolls. When the lower mold is further raised, the conveyor rolls are retracted into the grooves for thereby supporting the glass sheet only on the upper surface of the lower mold, whereupon the glass sheet is shaped or curved into a configuration complementary to the curved shape of the shaping surface of the lower mold. Then, an upper mold is lowered to attract the glass sheet against its lower surface under vacuum, and then is elevated to lift the glass sheet. Now, a ring mold is introduced between the upper and lower molds, and the vacuum in the upper mold is removed by an evacuation device to allow the glass sheet to be transferred onto the ring mold. The ring mold has a greater curvature than that of the upper mold for curving the marginal edge of the glass sheet to a larger curvature than that of the other area of the glass sheet. Identical or similar conveyor rolls are also disclosed in U.S. Pat. Nos. 3,455,672, 3,782,916, 4,197,108, 4,272,274, 4,285,715, 4,430,110, and 4,589,901.

In each of the conventional apparatus disclosed in the above patents, the lower mold has a plurality of grooves defined therein. When the lower mold receives a glass sheet from conveyor rolls, the lower mold is raised or the conveyor rolls are lowered to retract the conveyor rolls into the respective grooves. However, the disclosed apparatus for manufacturing curved glass sheets are disadvantageous for the following reasons: The lower mold with such plural grooves defined therein is complex in construction, and cannot easily be manufactured. Since the upper surface of the lower mold, which serves as the shaping surface, is only partly used for shaping the glass sheet, certain difficulty is experienced in shaping the glass sheet to desired curvature. Moreover, the efficiency of cooling the glass sheet is poor as holes for ejecting cooling air cannot be defined at uniform intervals in the upper surface of the lower mold. In addition, the conveyor rolls, once they have received a glass sheet from a heating furnace, cannot be corrected in their positions. Therefore, if the glass sheet has inaccurately been transferred from the heating furnace into position on the conveyor rolls, the conveyor rolls cannot convey the glass sheet properly onto the upper surface of the lower mold.

SUMMARY OF THE INVENTION

It is therefore an object of the present invention to provide an apparatus for manufacturing curved glass sheets, which can employ a lower mold of a simple structure.

Another object of the present invention is to provide an apparatus for manufacturing curved glass sheets wherein the glass sheet can be transferred accurately into a prescribed position.

Still another object of the present invention is to provide an apparatus for manufacturing curved glass sheets wherein the glass sheet can be curved to exact curvature and can appropriately be cooled.

According to the present invention, there is provided a glass sheet conveyor mechanism for conveying a glass sheet heated substantially up to its softening point in a heating station and then transferring the heated glass sheet onto a mold disposed downstream of the heating station in a direction in which the glass sheet is conveyed, in an apparatus for manufacturing a curved glass sheet, the glass sheet conveyor mechanism comprising guiding means including a pair of movable rails extending in said direction and movable transversely of the direction, traveling means movable between a first position in which the glass sheet is discharged from the heating station and a second position in which the glass sheet is transferred onto the mold, and conveying means supported on the traveling means and engaging the movable rails for conveying the glass sheet from the first position to the second position, the conveying means being movable transversely of said direction to transfer the glass sheet onto the mold when the traveling means reaches the second position.

According to the present invention, there is also provided an apparatus for manufacturing a curved glass sheet, comprising a glass sheet conveyor mechanism having conveying means for conveying a glass sheet heated substantially up to its softening point in a heating station, and a mold mechanism disposed downstream of the heating station with respect to a direction in which the glass sheet is conveyed by the conveyor mechanism, for curving the glass sheet a prescribed curvature, the glass sheet conveyor mechanism comprising guiding means including a pair of movable rails extending in said direction and movable transversely of the direction, and traveling means movable between a first position in which the glass sheet is discharged from the heating station and a second position in which the glass sheet is transferred into the mold mechanism, the conveying means being supported on the traveling means and engaging the movable rails for conveying the glass sheet from the first position to the second position, the conveying means being movable transversely of said direction to transfer the glass sheet into the mold mechanism when the traveling means reaches the second position.

The guiding means further includes a pair of fixed rails disposed inwardly of and extending parallel to the movable rails. The conveying means comprises a plurality of pairs of laterally spaced conveyor plates having outer ends engaging the movable rails. The conveyor plates include a single most downstream conveyor plate with opposite ends thereof fixed to the fixed rails. The conveyor plates are covered with woven pieces of cloth of aramid or carbon fibers, or pieces of felt for preventing damage to the glass sheet. The traveling means comprises traveling assemblies each comprising a pair of chains of interconnected carriers and a plurality of rollers rotatably supported on the carriers for rollingly movable on the fixed rails. When the traveling assemblies move on and along the fixed rails, the conveyor plates are moved in the direction in which the glass sheet is conveyed. When the movable rails move transversely of said direction, the conveyor plates are moved away from the mold mechanism.

After the glass sheet which has been heated to its softening point in the heating station is received by the conveyor plates in the first position, the traveling assemblies are moved on the fixed rails toward the second position. After the traveling assemblies have reached the second position, the movable rails are displaced outwardly away from the fixed rails, and the conveyor plates are also displaced outwardly in opposite directions transversely of the direction in which the glass sheet is conveyed. The glass sheet is now transferred into the mold mechanism, and then curved to the desired curvature by a plurality of molds of the mold mechanism.

Even if the glass sheet is displaced when the conveyor plates have reached the second position, the movable rails and hence the conveyor plates may be moved to correct the position of the glass sheet, so that the glass sheet can be carried into a suitable position on one of the molds. When the glass sheet is transferred onto said one mold, i.e., the lower mold, the conveyor plates and the lower mold do not intersect with each other. Therefore, the lower mold is not required to have grooves or the like which would otherwise be needed as is the case with the conventional apparatus.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is an enlarged fragmentary view of FIG. 2;

FIG. 5 is a cross-sectional view taken along line V—V of FIG. 4;

FIG. 7 is a fragmentary plan view of modified conveyor plates;

FIG. 8 is a fragmentary plan view of other modified conveyor plates; and

FIG. 9 is a perspective view of the conveyor plates of FIG. 8.

DETAILED DESCRIPTION OF THE PREFERRED EMBODIMENTS

Figure 1:
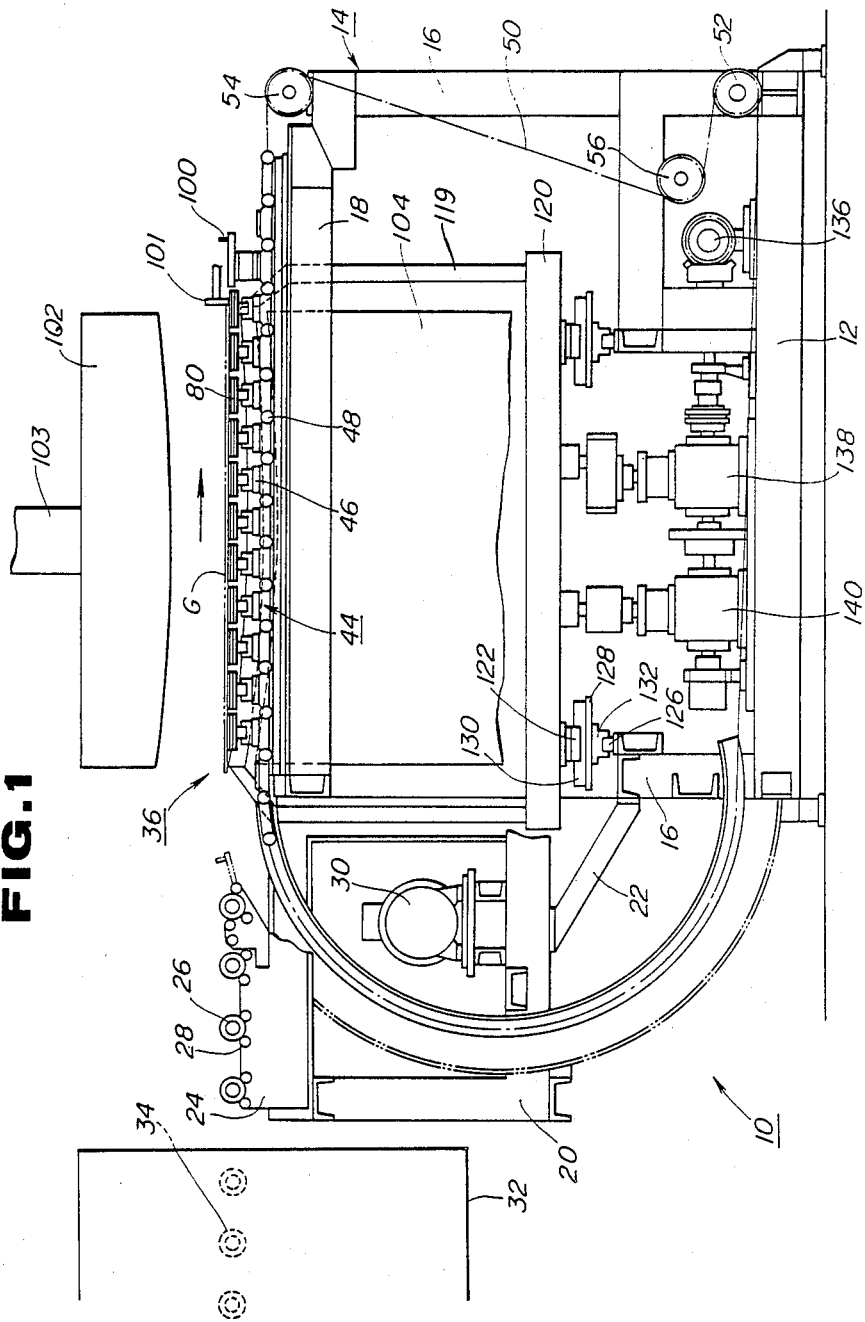
FIG. 1 is a front elevational view of an apparatus for manufacturing curved glass sheets according to the present invention.
Figure 2:
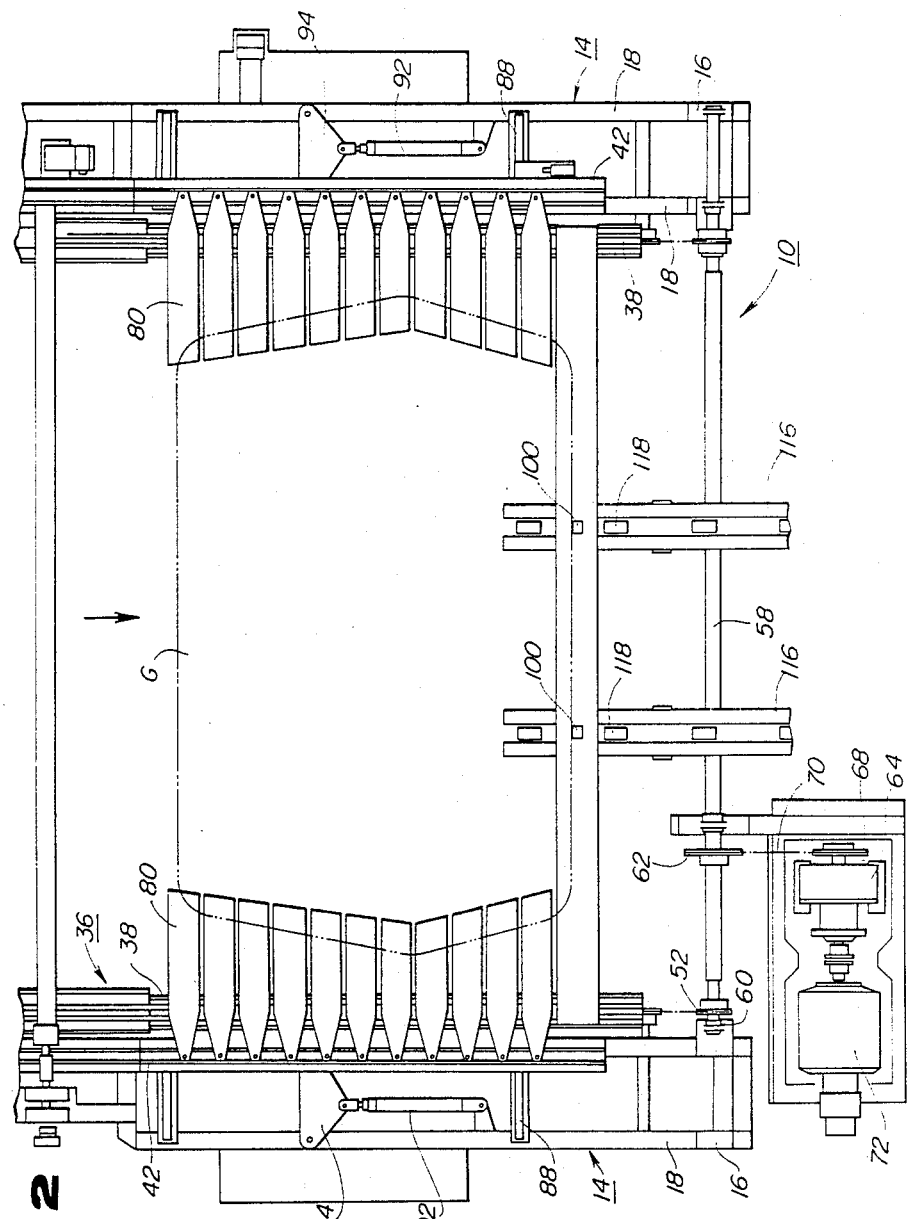
FIG. 2 is a plan view of the apparatus shown in FIG. 1, showing a glass sheet conveyor mechanism in the apparatus in detail.
Figure 3:
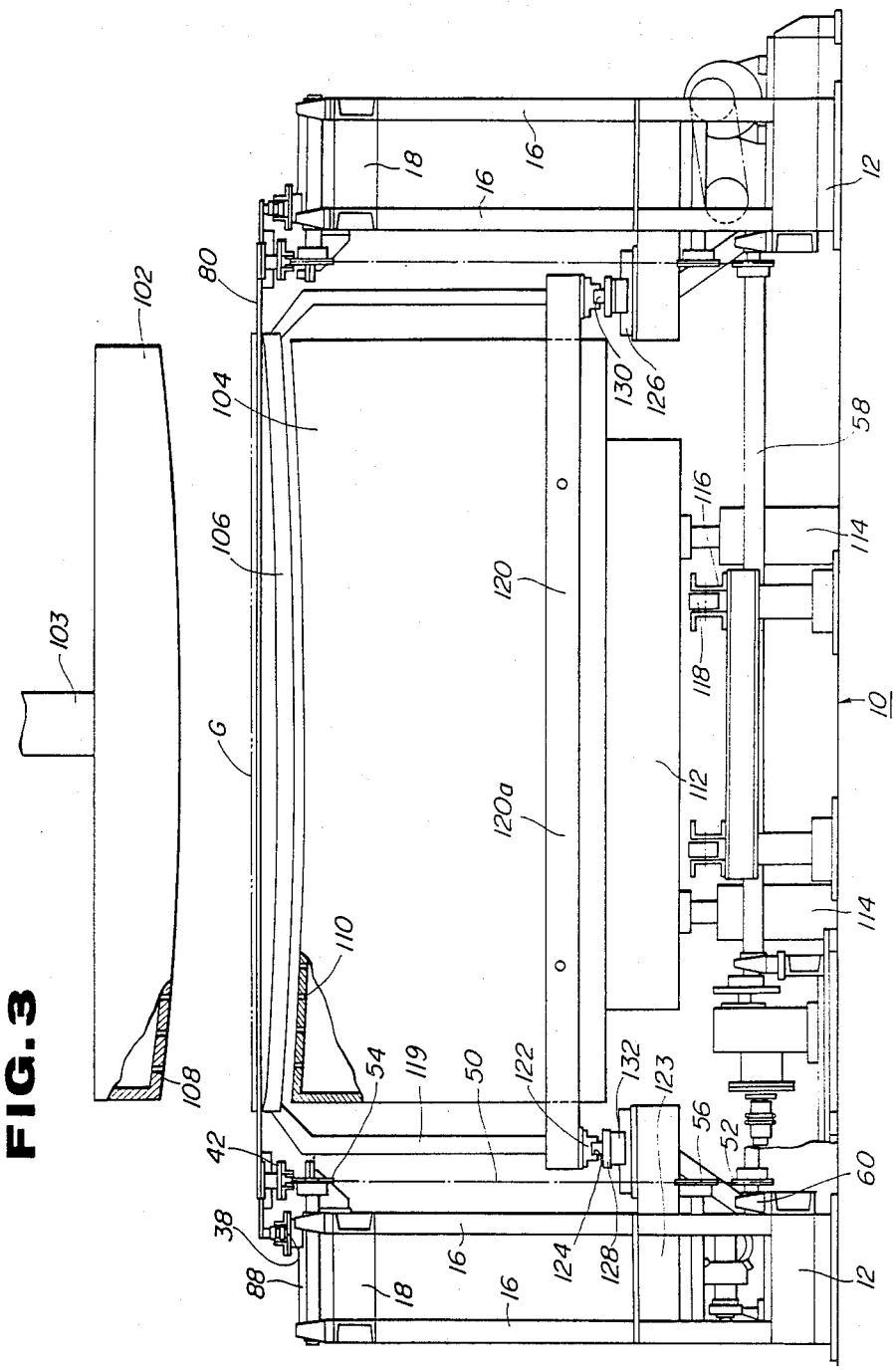
FIG. 3 is a side elevational view of the apparatus as viewed in the direction of the arrow in FIG. 1.

As shown in FIGS. 1 through 3, an apparatus 10 for manufacturing curved glass sheets according to the present invention has two bases 12 spaced from each other transversely across the direction in which a glass sheet G is conveyed (indicated by the arrow in FIGS. 1 and 2), and two main frames 14 mounted respectively on the upper surfaces of the bases 12. Each of the main frames 14 is constructed of vertical frame members 16 disposed on the four corners, respectively, of the base 12, and a plurality of horizontal frame members 18 interconnecting the four vertical frame members 16. A support frame 20 is attached to the lefthand sides (FIG. 1) of the main frames 14, i.e., the upstream sides thereof, and reinforced by stays 22 connected between the support frame 20 and the main frames 14. Two rails (only one of which is shown) 24 are mounted on the upper surface of the support frame 20. A plurality of conveyor rolls 26 are rotatably supported on the rails 24 at equally spaced intervals in the longitudinal direction of the rails 24, along which the glass sheet G is fed. The conveyor rolls 26 are operatively coupled to a motor 30 mounted on the support frame 20 through a drive chain (not shown) for being rotated by the motor 30.

A tunnel-type heating furnace 32 is disposed upstream of and closely to the support frame 20. A flat glass sheet G, while it is being conveyed by a conveyor device 34, is heated to its softening point in the heating furnace 32. The softened glass sheet G as it is conveyed out of an outlet opening defined in the downstream side of the furnace 32 is received by the conveyor rolls 26 on the support frame 20. The glass sheet G is then conveyed downstream by the conveyor rolls 26 and transferred to a glass sheet conveyor mechanism 36 according to the present invention.

The glass sheet conveyor mechanism 36 comprises two spaced inner rails 38 fixed to brackets or extension frames 40 (FIG. 5) projecting from the horizontal frame members 18 of the main frames 14, and two spaced outer rails 42 positioned outwardly of the inner rails 38, respectively, parallel thereto and movable in a direction across the direction of feed of the glass sheet G. The inner and outer rails 38, 42 extend from the downstream ends of the horizontal frame members 18 parallel thereto up to the upstream ends of the frame members 18, and include upstream rail portions extending toward the heating furnace 32 and curved downwardly in semicircular shapes with the distal ends reaching the lower ends of the upstream vertical frame members 14. As shown in FIG. 2, the outer rails 42 have straight rail portions and curved rails portions which are separate from each other, only the straight rails portions being movable across the direction in which the glass sheet G is conveyed.

As shown in FIGS. 4 and 5, two traveling assemblies (or carrier means) 44 are movable on and along the respective inner rails 38 in the glass sheet conveying direction. Each of the traveling assemblies 44 comprises a chain of interconnected carriers 46 and a plurality of rollers 48 rotatably attached to the carriers 46. The most upstream carrier 46 and the most downstream carrier 46 are interconnected by a chain 50 indicated by the dot-and-dash line in FIG. 1. The chain 50 is held in mesh with three sprockets 52, 54, 56. Therefore, the traveling assembly 44 can be moved along the inner rail 38 by rotating the sprockets 52, 54, 56.

As best shown in FIG. 2, the two sprockets 52 associated respectively with the two traveling assemblies 44 and located at the lowest position among the three sets of sprockets 52, 54, 56 are mounted on the opposite ends, respectively, of a shaft 58 extending horizontally between the main frames 14. The shaft 58 is rotatably supported by bearings on brackets 60 mounted on the respective bases 12. A drive chain 70 is trained around a sprocket 62 fixed to the shaft 58 and a driver sprocket 68 fixed to the output shaft 66 of a speed reducer 64 positioned downstream of and closely to one of the main frames 14. The speed reducer 64 is coupled to a reversible motor 72 for reducing the rotational speed of the motor 72. When the motor 72 is energized, the driver sprocket 68 is rotated to cause the drive chain 70 to rotate the driven sprocket 62. Upon rotation of the driven sprocket 62, the shaft 58 and hence the sprockets 52 thereon are rotated to enable the chain 50 to move the traveling assemblies 46 along the inner rails 38.

The softened glass sheet G delivered from the conveyor rolls 26 is received on structure for supporting the glass sheet G and transferring the sheet to the mold. The glass sheet support/transfer structure includes a plurality of pairs of laterally spaced conveyor plates 80 followed by a single most downstream conveyor plate. For the sake of brevity, those conveyor plates 80 located on one side of the apparatus will be described with reference to FIGS. 4 and 5.

The conveyor plates 80 are made of metal for supporting a marginal edge of the glass sheet G. The conveyor plates 80 are covered on their upper surfaces with woven pieces of cloth of aramid or carbon fibers, or pieces of felt for preventing damage to the glass sheet G. The conveyor plates 80 have lengths determined according to the shape of the glass sheet G to be curved. In the illustrated embodiment, the glass sheet G to be curved is widest at its central area and is progressively narrower toward the upstream and downstream ends thereof. Therefore, the conveyor plate 80 positioned at the center is shortest, and the conveyor plates 80 located at the upstream and downstream ends are longest. Each of the conveyor plates 80 comprises two upper and lower plate members 80a, 80b joined together with their ends superposed. The upper plate member 80a supports the lower surface of the glass sheet G, whereas the lower plate member 80b engages the outer rail 42, as shown in FIG. 5. More specifically, a vertical shaft 82 is rotatably mounted on the outer end of the upper plate member 80a, and a roller 84 fixed to the lower end of the shaft 82 rides in a guide groove 86 on the outer rail 42.

When the glass sheet G is to be transferred into a mold assembly (described later on), the laterally spaced conveyor plates 80 in plural pairs are moved outwardly away from the glass sheet G in a direction across the glass sheet conveying direction, which is substantially perpendicular thereto, between an inner glass sheet supporting position and an outer glass sheet transferring position. Such outward movement of the conveyor plates 80 is carried out by the straight rail portions of the outer rails 42 which slide away from the inner rails 38 along short transverse guide rails 88 mounted on the horizontal frame members 18. More specifically, two spaced vertical plates 42a are mounted on the lower surface of the outer rail 42 astride each of the transverse guide rails 88. Therefore, the outer rails 42 are movable along the guide rails 88 with the vertical plates 42a being guided astride the guide rails 88. Each of the carriers 46 of the traveling assemblies 44 has two upstanding vertical guide plates 46a spaced from each other and defining a guide groove 90 therebetween. A vertical plate 80c depending from the lower surface of the plate member 80b of each conveyor plate 80 engages in the guide groove 90. Therefore, the outer rails 42 are slidable outwardly while being guided by the transverse guide rails 88, and the conveyor plates 80 are slidable outwardly while being guided by the guide plates 46a on the carriers 46.

As shown in FIG. 4 in detail, each of the outer rails 42 is moved by a cylinder 92 attached to the outer horizontal frame member 18 of one of the main frames 14, and a swingable plate 94 connected to the cylinder 92, the swingable plate 94 being substantially in the shape of an isosceles triangle as viewed in plan. The swingable plate 94 has an outer corner 94a pivotally coupled to the horizontal frame member 18, a central corner 94b pivotally coupled to the distal end of the piston rod 96 of the cylinder 92, and an inner corner 94c supporting a rotatable roller 98 rotatably and movably engaging in a groove between guide rails (not shown) on the lower surface of the outer rail 42. When the cylinder 92 is actuated to extend the piston rod 96, the swingable plate 94 swings clockwise about the pivoted corner 94a as indicated by the arrow. Such swinging movement of the swingable plate 94 causes the outer rail 42 to slide outwardly on the guide rails 88, thus moving the conveyor plates 80 outwardly.

The single conveyor plate located most downstream has two stoppers 100 (FIG. 2) on its upper surface for positioning the glass sheet G.

In the illustrated embodiment, the glass sheet G is curved by a mold assembly comprising an upper mold 102, a lower mold 104, and a ring mold 106. As shown in FIGS. 1 and 2, the upper mold 102 is of a hollow construction having a lower shaping surface which is convex downwardly. The lower shaping surface of the upper mold 102 has a number of air ejector holes 108 defined in a zigzag matrix pattern for ejecting cooling air against the upper surface of the glass sheet G to quench the curved glass sheet G. The upper mold 102 can be vertically moved by a hydraulic raising and lowering device 103. The lower mold 104 is also of a hollow structure having an upper shaping surface which is concave upwardly with the same curvature as that of the lower shaping surface of the upper mold 102. The upper shaping surface of the lower mold 104 also has a number of air ejector holes 110 defined in a zigzag matrix pattern. The lower mold 104 is disposed on a support table 112 which can be vertically moved by a plurality of hydraulic raising and lowering devices 114 to move the lower mold 104 upwardly. As illustrated in FIGS. 2 and 3, two conveyor rails 116 extend in the glass sheet conveying direction for carrying the lower mold 104 into the apparatus. Each of the conveyor rails 116 has a number of rotatable rollers 118 for facilitating movement of the support table 112.

The ring mold 106 serves to curve the marginal edge of the glass sheet G. Therefore, the ring mold 106 has a shape substantially complementary to the outer profile of the glass sheet T to be curved. As shown in FIGS. 1 and 3, the ring mold 106 is supported on a plurality of upstanding posts 119 erected on a support frame 120 comprising four frame members, i.e., front and rear frame members 120a and two side frame members 120b. Each of the side frame members 120b has two longitudinally spaced projections 122 mounted on the lower surface thereof and having respective recesses 124 opening downwardly. Other support frames 123 project inwardly from the main frames 14, and transverse guide rails 126 are mounted respectively on the upper surfaces of the support frames 123. Intermediate members 128 engage the guide rails 126 and the projections 122. More specifically, the intermediate members 128 have upper longitudinal guide rails 130 engaging in the grooves 124 of the projections 122, and lower transverse projections 132 having recesses 134 in which the guide rails 126 engage. When an oscillation motor 136 is energized, the support frame 120 can be moved back and forth and laterally in an elliptical pattern by gear mechanisms 138, 140 operatively coupled to the motor 136.

Figure 6A:
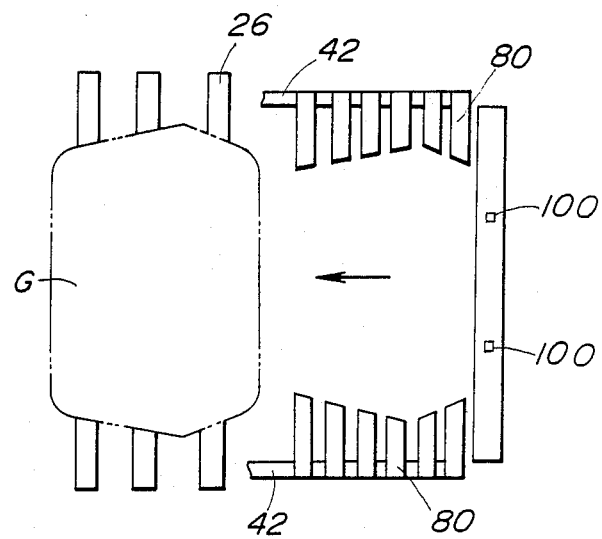
FIGS. 6A through 6C are fragmentary plan views of a plurality of conveyor plates, successively showing operation of the glass sheet conveyor mechanism illustrated in FIG. 2.

Operation of the apparatus will be described below. The motor 72 is energized to rotate the sprockets 52 counterclockwise in FIG. 1. The chains 50 are moved counterclockwise by the sprockets 52 to move the traveling assemblies 36 and hence the conveyor plates 80 on and along the inner rails 38 from a "transfer position" indicated by the solid lines in FIG. 1 in which the glass sheet G is transferred onto the ring mold 106 to a "standby position" indicated by the broken lines in which the glass sheet G is received from the conveyor rolls 26, as indicated by the arrow in FIG. 6A. When the movement of the traveling assemblies 36 to the transfer position is completed as detected by a detector such as a limit switch or the like (not shown), the motor 72 is temporarily de-energized. When the traveling assemblies 36 and hence the conveyor plates 80 are in the standby position, the most downstream conveyor plate is positioned near the most downstream conveyor roll 26.

Figure 6B:
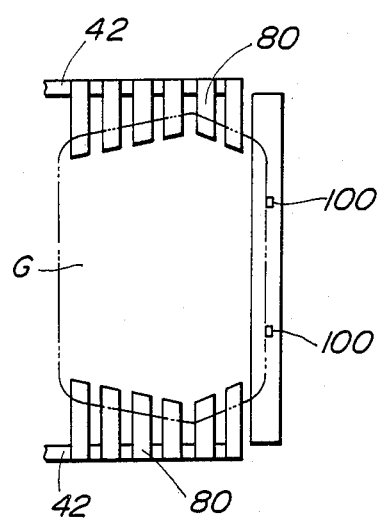

During this time, a flat glass sheet is heated up to its softening point in the heating furnace 32 while being conveyed by the conveyor device 34, and thereafter is transferred onto the conveyor rolls 26. The glass sheet G moves on the conveyor rolls 26 until its leading end contacts the stoppers 100 on the most downstream conveyor plate 80, whereupon a detector such as a limit switch is turned on. The motor 72 is then reversed to rotate the sprockets 52 clockwise in FIG. 1. The chains 50 are also moved clockwise by the sprockets 52 to return the traveling assemblies 36 back to the transfer position. As the chains 50 are moved, the glass sheet G is transferred progressively onto the conveyor plates 80. Thereafter, the glass sheet G is fully transferred onto the conveyor plate 80 as shown in FIG. 6B. The speed of rotation of the conveyor rolls 26 and the speed of travel of the traveling assemblies 36 are selected such that the speed at which the glass sheet G is conveyed by the conveyor rolls 26 is equalized to the speed at which the glass sheet G is conveyed by the conveyor plates 80 for transferring the glass sheet G smoothly from the conveyor rolls 26 onto the conveyor plates 80.

Figure 6C:
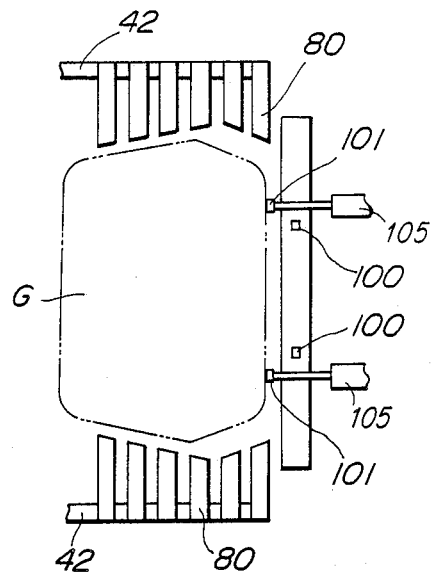

When the conveyor plates 80 completely receive the glass sheet G and further move above the ring mold 106, the leading end of the glass sheet G hits stoppers 101 operated by respective hydraulic cylinders 105. When the glass sheet G engages the stoppers 101, the most downstream conveyor plate 80 is displaced off the glass sheet G as shown in FIG. 6C. At this time, the cylinders 92 are operated to turn the swingable plates 94 about the pivoted corners 94a (clockwise in FIG. 4). As the swingable plates 94 are turned, the outer rails 42 are now caused to slide outwardly on the rails 88 and hence the conveyor plates 80 are moved together outwardly until they are displaced off the glass sheet G, whereupon the glass sheet G is placed on the ring mold 106.

After the ring mold 106 has curved the marginal edge of the glass sheet G to desired curvature, the raising and lowering devices 114 are operated to lift the support table 112 and the lower mold 104, and tho upper mold 102 is lowered by the raising and lowering device 103. The upper and lower molds 102, 104 now come together to shape or curve the glass sheet G therebetween. At this time, the shaping surfaces of the upper and lower molds 102, 104 should preferably lie at the same level as the ring mold 106 so that the ring mold 106 does not need to be removed when the upper and lower molds 102, 104 are operated.

After the glass sheet G has been curved to desired curvature, the upper and lower molds 102, 104 are moved away from the glass sheet G, letting only the ring mold 106 support the glass sheet G thereon. Cooling air is then ejected from the air ejector holes 108, 110 of the upper and lower molds 102, 104 to quench or anneal the glass sheet G. While the glass sheet G is being annealed by cooling air, the motor 136 is energized to move the support frame 120 in an elliptical path so that cooling air can be applied uniformly over the entire surface of the glass sheet G.

FIG. 7 shows modified conveyor plates including a pair of most downstream conveyor plates 140 laterally spaced from each other and having respective stoppers 142 thereon.

FIG. 8 illustrates other modified conveyor plates including a most upstream single conveyor plate 144 identical to the most downstream single conveyor plate. The conveyor plates arranged as shown in FIG. 8 can support the entire marginal edges of the glass sheet G.

While the conveyor plates may extend horizontally, they may have curved surfaces slanted downwardly in the inward direction, as shown in FIG. 9, at the same curvature as the desired curvature to which the glass sheet G is to be curved.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A system for conveying a heated glass sheet and transferring the heated glass sheet to a mold means, comprising:

a frame;

guide means supported on said frame, said guide means including a pair of fixed inner rails extending parallel to one another in a first direction in which the glass sheet is conveyed between a first position and a second position and a pair of outer movable rails, said movable rails extending in said first direction parallel to said pair of fixed rails;

moving means for moving each of said movable rails in a second direction substantially perpendicular to said first direction of conveyance of the glass sheet between an inner glass sheet supporting position and an outer glass sheet transfer position;

carrier means movably engaged with each rail of said pair of fixed rails and movable along said fixed rails between said first and second positions; and glass sheet support/transfer means for supporting said glass sheet thereon and transferring the glass sheet to the mold means, said glass sheet support/transfer means comprising a plurality of pairs of plates respectively supported on said carrier means for movement therewith and respectively engaged with said pair of movable rails for movement therewith in said second direction substantially perpendicular to the first direction, whereby the glass sheet can be conveyed from the first position to the second position and transferred to the mold means.

2. The system of claim 1, wherein said plates have a curvature substantially identical to a curvature of the glass sheet.

3. The system of claim 2, wherein said system includes a leading plate extending between said fixed rails at a downstream end of the second position and having stoppers for engagement with a leading edge of the glass sheet.

4. The system of claim 1, wherein said system further includes a transverse plate which extends between said fixed rails at a downstream end of the second position.

5. The system of claim 4, wherein said transverse plate has stoppers for engagement with the glass sheet.

* * * * *